United States Patent [19]
Lee et al.

[11] Patent Number: 6,153,003
[45] Date of Patent: Nov. 28, 2000

[54] PROCESS FOR PREPARING A HOMOGENEOUS CELLULOSE SOLUTION USING N-METHYLMORPHOLINE-N-OXIDE

[75] Inventors: Wha Seop Lee; Byoung Chul Kim; Seong Mu Jo; Jong Su Park; Seong Joo Lee, all of Seoul; Young Geun Park, Kyungsangnam-do; Seung Lak Lee, Kyungsangnam-do; Young Se Oh, Kyungsangnam-do, all of Rep. of Korea

[73] Assignees: Korea Institute of Science and Technology, Seoul; Hanil Synthetic Fiber Co., Ltd., Kyungsangnam-do, both of Rep. of Korea

[21] Appl. No.: 09/147,369

[22] PCT Filed: Jun. 5, 1997

[86] PCT No.: PCT/KR97/00104

§ 371 Date: Feb. 10, 1999

§ 102(e) Date: Feb. 10, 1999

[87] PCT Pub. No.: WO97/47790

PCT Pub. Date: Dec. 18, 1997

[30] Foreign Application Priority Data

Jun. 10, 1996 [KR] Rep. of Korea ............ 96-20567

[51] Int. Cl.$^7$ ............ C08L 1/02; C09D 101/02
[52] U.S. Cl. ............ 106/200.2; 106/200.3; 264/186; 264/211
[58] Field of Search ............ 106/200.2, 200.3; 264/186, 211

[56] References Cited

U.S. PATENT DOCUMENTS

| | | |
|---|---|---|
| 4,144,080 | 3/1979 | McCorsley, III et al. . |
| 4,211,574 | 7/1980 | McCorsley, III et al. . |
| 4,246,221 | 1/1981 | McCorsley, III . |
| 4,416,698 | 11/1983 | McCorsley, III . |
| 5,584,919 | 12/1996 | Lee et al. ............ 264/186 |
| 5,656,224 | 8/1997 | Zikeli et al. . |

OTHER PUBLICATIONS

Germany Abstracts, AN 85–128653, DD 218104,(Jan. 30, 1985).

*Primary Examiner*—David Brunsman
*Attorney, Agent, or Firm*—Oblon, Spivak, McClelland, Maier & Neustadt, P.C.

[57] ABSTRACT

A simple method of preparing a homogeneous cellulose solution is disclosed, which comprises the steps of (a) preparing fibrillar cellulose powder; (b) injecting a molten liquid tertiary amine oxide solvent into a twin screw extruder; (c) feeding the cellulose powder of step (a) into a section of the twin screw extruder where the molten liquid tertiary amine oxide solvent fed in step (b) produces a well swollen paste with the cellulose powder fed in step (c); (d) dissolving the well swollen cellulose paste in the following melting sections in the twin screw extruder; and (e) stabilizing the solution obtained in step (d) in a storage tank.

5 Claims, 2 Drawing Sheets

ZONE 1: FEEDING SECTION OF MOLTEN NMMO

ZONE 2: MIXING AND KNEADING SECTION TO PRODUCE A SWOLLEN PASTE OF CELLULOSE AND NMMO

ZONE 3: CONVEYING SECTION

ZONE 4: MELTING AND HOMOGENIZING SECTION

ZONE 5: DEFOAMING AND METERING SECTION

PROCESS FOR PREPARING A HOMOGENEOUS CELLULOSE SOLUTION USING N-METHYLMORPHOLINE-N-OXIDE

This application is a 371 of PCT/KR97/00104 filed Jun. 05, 1997.

BACKGROUND OF THE INVENTION

1. Field of the Invention

The present invention relates to a process for preparing a highly homogeneous cellulose solution which can be used in the production of cellulosic fibers or films. More particularly, the present invention relates to a process for preparing a highly homogeneous cellulose solution by directly dissolving cellulose powder in a liquid N-methylmorpholine-N-oxide solvent in an extruder.

2. Description of the Prior Art

Graenacher et al. first suggested a process for preparing a cellulose solution in a tertiary amine oxide in U.S. Pat. No. 2,179,181. Subsequently, more efficient and economical processes have been proposed.

U.S. Pat. Nos. 4,142,913, 4,144,080, 4,196,262 and 4,246,221 disclose processes which comprise swelling cellulose in an aqueous solution of a tertiary amine oxide having a water content of 22% or more, which will not dissolve the cellulose due to its relatively high water content, and subsequently distilling off the excess amount of water in the resulting slurry to dissolve the cellulose therein. The processes require an extended period of time to perform the distillation under reduced pressure. However, the distillation tends to cause discoloration of the solution due to the thermal degradation of the solvent and cellulose. As a whole, these processes are complicated as well as time and energy consuming.

Similarly to the above U.S. Patents, European Patent No. 356,419 to Zikeli et al. discloses a continuous process of producing 72 kg of cellulose solution per hour, wherein distillation/concentration is a still essential step. More specifically, the process comprises swelling cellulose in an aqueous N-methylmorpholine-N-oxide (hereinbelow, referred to as "NMMO") solution having a water content of 40%, and distilling the swollen slurry under reduced pressure in a screw extruder with fan-shaped flights. Quigley also uses a thin film evaporator as a reduced-pressure distillater as disclosed in WO 94/06530. However, not only is the highly viscous slurry not efficiently concentrated, but the reduced pressure distillation inevitably requires complicated apparatus. Thus, disadvantages of these processes are their low productivity and complexity.

U.S. Pat. No. 4,211,574 suggests another method of producing a cellulose solution, wherein a cellulose pulp sheet is soaked and swollen at a temperature of 85 to 95° C. in a tertiary amine oxide solution having a water content of 5 to 15%, sufficiently low to dissolve the cellulose therein, and is subjected to stirring and heat treatment without the concentration step. In this method, however, since the amine oxide solvent can only partially swell the surface of the cellulose pulp sheet and consequently will form a coating thereon, the cellulose in the solution tends to remain undissolved because the penetration of the amine oxide solvent is prohibited by the coating. Once coatings are formed on the surface, a homogeneous solution cannot be obtained even by vigorous stirring or heating. Thus, a disadvantage of the process is that it fails to produce a homogeneous cellulose solution.

U.S. Pat. No. 4,416,698 proposes still another process for producing a cellulose solution. In accordance with the process, cellulose powder and a solid NMMO are simply mixed and transferred to an extrusion apparatus wherein the mixture is dissolved to give a cellulose solution. The two powder components, especially when used in a large amount, will not make a sufficiently uniform mixture to leave a part of the cellulose powder undissolved in the resulting solution. In combination with a lower fluidity, this makes the process unsuitable for industrialization and mass production.

The various processes for producing a cellulose solution in a tertiary amine oxide suggested in the prior art patents as mentioned above may be categorized into three groups as follows:

Group I: Processes as disclosed in U.S. Pat. Nos. 4,142,913, 4,144,080, 4,196,262, 4,246,221, 4,290,855 and 4,324,539, and European Pat. No. 356,419.

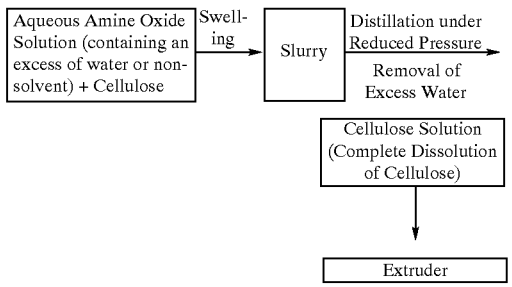

Group II: Process as disclosed in U.S. Pat. No. 4,211,574.

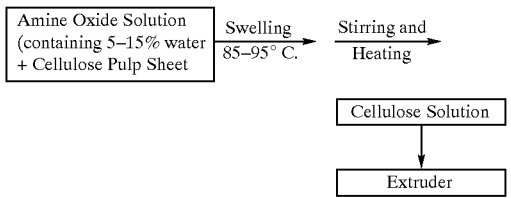

Group III: Process as disclosed in U.S. Pat. No. 4,416,698.

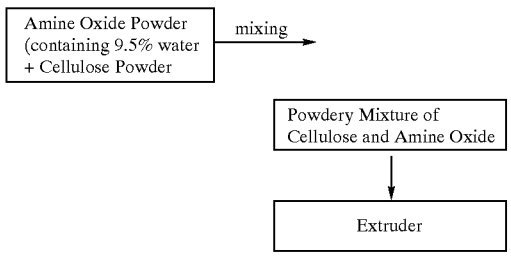

As set forth above, the prior art processes have the problems of being complicated processes and/or requiring apparatus due mainly to the reduced-pressure distillation, and yielding unsatisfactory homogeneity resulting from a high NMMO concentration in the solution.

As a result of extensive investigation, the present inventors discovered that the problems of the prior art mentioned above can be eliminated by using fibrillar cellulose powder or fluff, instead of a cellulose pulp sheet as conventionally used, in a highly concentrated aqueous solution of NMMO having a water content of 5 to 20% and maintained at the temperature range of from 50 to 130° C. This process can provide a homogeneous solution in a simpler manner, while not forming a coating on the surface of cellulose as in a process using a cellulose pulp sheet.

Contrary to the conventional processes which require swelling in a tertiary amine oxide and subsequent distillation, the process of the present invention can directly produce a cellulose solution without swelling by using fibrillar cellulose powder. Because the solvent can easily penetrate through the fibrillar cellulose, the process of the invention is a simpler process that is able to obtain complete dissolution of cellulose in a shorter period of time.

SUMMARY OF THE INVENTION

It is therefore an object of the present invention to provide a short and simple process for producing a highly homogeneous cellulose solution.

Further objects and advantages of the invention will become apparent by referring to the remainder of the specification.

DETAILED DESCRIPTION OF THE INVENTION

According to one embodiment of the invention, a process for preparing a homogeneous cellulose solution is provided which comprises the steps of:

(a) preparing fibrillar cellulose powder with a particle size distribution required for dissolution in a tertiary amine oxide solvent;

(b) injecting a molten liquid tertiary amine oxide solvent into a twin screw extruder;

(c) feeding the cellulose powder of step (a) into a section of the twin screw extruder where the molten liquid tertiary amine oxide solvent fed in step (b) produces a well swollen paste with the cellulose powder fed in step (c);

(d) dissolving the well swollen cellulose paste in the following melting sections in the twin screw extruder; and (e) stabilizing the solution obtained in step (d) in a storage tank.

As a source of cellulose, fluff-like, or in consideration of quantitative aspect, cellulose powder of 1,000 μm or less in particle size can be typically used to obtain a homogeneous solution. More preferably, cellulose powder having a particle size of 600 μm or less may be used to obtain a higher homogeneous solution. A larger particle size, as in cellulose sheets, can result in the formation of coatings on the surface of particles or particle gels which inhibits the formation of a homogeneous solution. Fibrillar cellulose powder can be obtained using a mill fitted with ring sieves or a knife-edged blade mill, preferably with a knife-edged blade mill with ring sieves.

The solvent which can be used to dissolve the cellulose powder is preferably a liquid aqueous NMMO solution containing 5 to 20% by weight of water. The temperature of the solvent is maintained in the range of 50 to 130° C. during the transportation in the extruder. The ratio of cellulose to NMMO solvent is such that the final cellulose solution has a concentration of 5 to 20% by weight, more preferably 8 to 15% by weight of cellulose according to the molecular weight of the polymer.

The invention will be described in greater detail with reference to the accompanying drawings.

Figure 1:
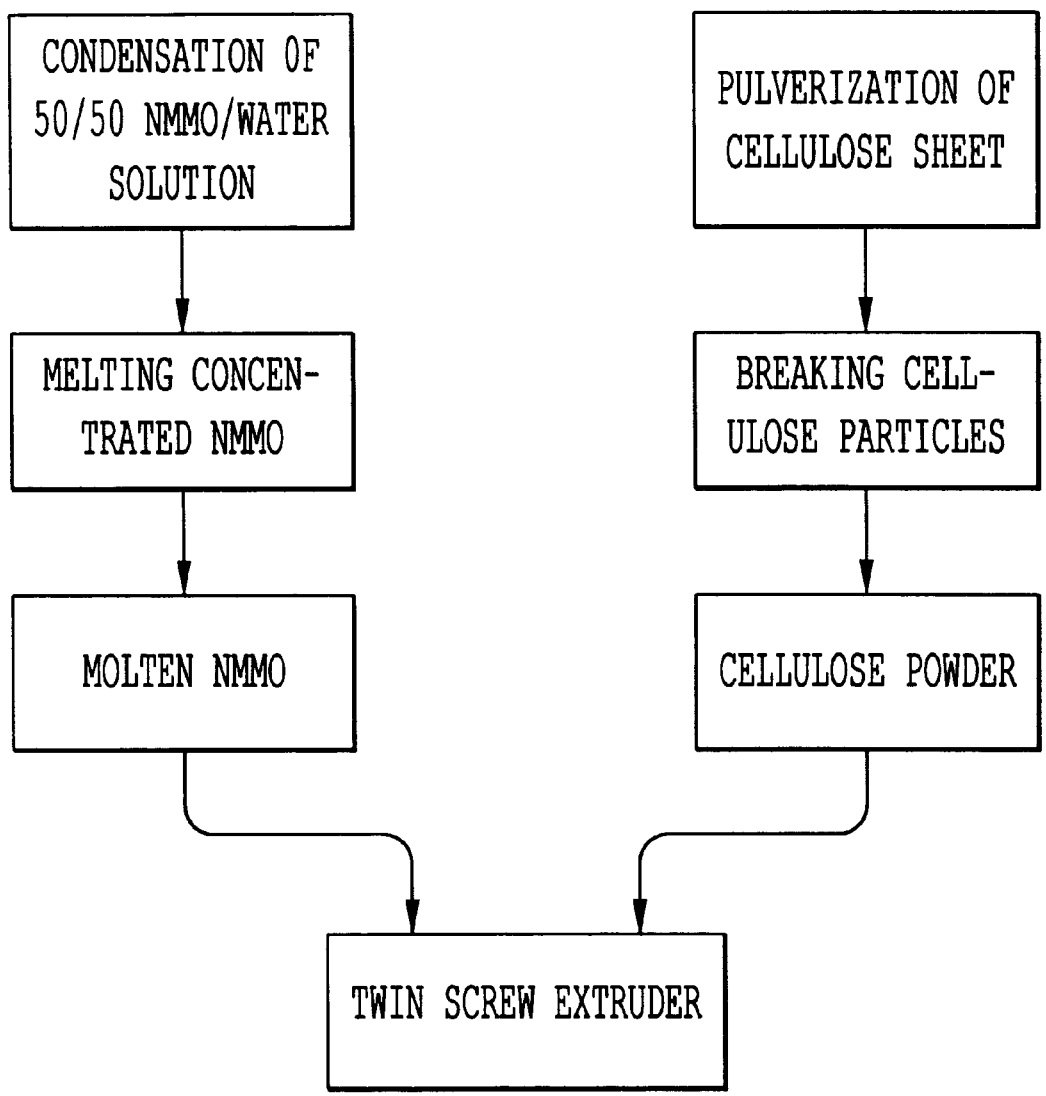
FIG. 1 is a schematic block diagram of the process for producing a cellulose solution according to the present invention.

As schematically illustrated in FIG. 1, the NMMO solvent is introduced into the extruder at a predetermined rate through the first hopper fitted with a gear pump. Pulverized cellulose powder is passed through a closed transporting conduit (not shown), preferably anti-static electricity treated, to a force feeder which introduces the powder to the second hopper at a predetermined rate. The NMMO solvent during the transportation in the extruder dissolves the cellulose being transported into the extruder.

Figure 2:
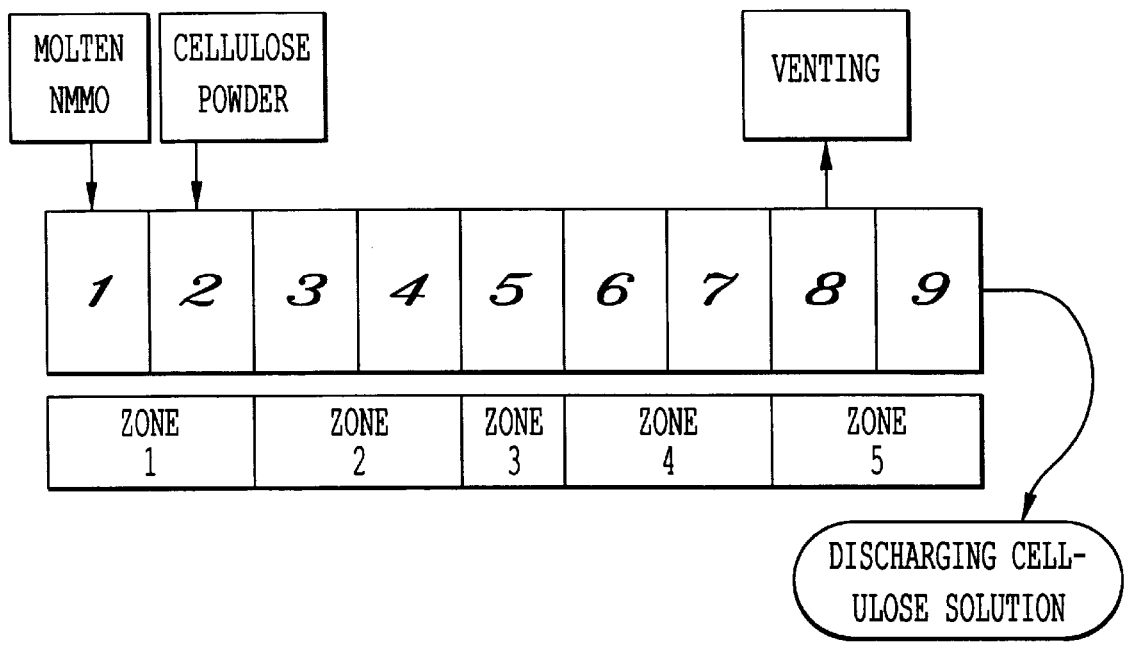
FIG. 2 shows a typical structure of a twin screw extruder which can be used according to the present invention.

FIG. 2 schematically illustrates the structure of a co-rotating twin screw extruder. The extruder includes nine blocks. Each block has an LID ratio of 4, in which D is 30 mm. The first two blocks comprise a feeding section of molten liquid NMMO. The following three blocks 3, 4 and 5 comprise an intensive mixing and kneading section of cellulose powder and molten liquid NMMO to produce well swollen paste state. The blocks 6 and 7 comprise an intensive kneading section to homogenize and melt the paste. The final two blocks 8 and 9 comprise a conveying section for completely melting and discharging the cellulose solution in NMMO. The defoaming is accomplished in block 8 through vacuum venting. The extruder further includes an injection feeder for the molten liquid NMMO and a side force feeder for the cellulose powder.

The molten liquid NMMO is fed into the first block by the gear pump at a given rate at 80 to 130° C. The temperature of the solvent is maintained in the range of 50 to 130° C. during the transportation in the extruder. In the third block, the cellulose powder is fed by force feeding using a side feeder so that the cellulose solution having a concentration of 5 to 20% by weight is obtained. In blocks 3 and 4, the mixture of cellulose and NMMO is intensively homogenized to give a uniform and well swollen paste without any unswollen part. In blocks 6 and 7, the mixture is further homogenized and melted, and then discharged after defoaming in the eighth block. The cellulose solution thus obtained is homogeneous enough to be spun.

The solution is then transferred to a storage tank with a pressure controller, wherein a highly homogeneous solution can be obtained after several minutes of stabilization. The highly homogeneous solution thus obtained is to be spun into cellulosic fibers, films and separation membranes.

PREFERRED EMBODIMENT OF THE INVENTION

The present invention will be described in greater detail by way of the following examples, which are not intended to limit the invention. In the examples, several characteristics of the resulting solution were evaluated as follows:

1) Weight average degree of polymerization ($DP_w$)

The change of the molecular weight of cellulose caused by decomposition during the production of the solution was obtained as follows.

The intrinsic viscosity of cellulose was determined in the concentration range of 0.1 to 0.6 g/dl at the temperature of 25±0.01° C. using Ubbelohde Viscometer No. 1 (Fisher Corporation) and 0.5M Cuene solution prepared according to ASTM D539-51T. The intrinsic viscosity of a sample [IV] was calculated from the concentration (c) and the specific viscosity $\eta_{sp}$ according to the following equation (1). $DP_w$ was calculated from the intrinsic viscosity [IV] as obtained above according to the Mark-Houwink equation as described in M. Marx, *Makromol. Chem.*, 16, 157 (1955); and J. Brandrup, E. H. Immergut, *Polymer Handbook,* 3rd ed., Vol. 144, Wiley-Interscience, New York, 1989.

$$[IV]=\lim[\eta_{sp}/C]c \to 0 \quad (1)$$

$$[IV]=0.98\times10^{-2}DP^{0.9} \quad (2)$$

b) Concentration of colored impurities

The color change of the solvent during the production of the cellulose solution was determined with a 30% aqueous NMMO solution. 10 g of cellulose solution was taken and soaked in 16.17 ml of distilled water for 60 minutes, i.e., until equilibrium was obtained. The colored impurities contained in the NMMO solution was determined using UV-Visible Spectrophotometer (Hewlett Packard Model HP8453). The absorbency of the solution was recorded at 450 nm. The results were presented as an amine oxide optical density (AOOD), which is an absorbency value of 1% by weight of NMMO solution at 450 nm. The AOOD of 50% aqueous NMMO (BASF Co.) was 0.0006.

c) Homogeneity of solution

The homogeneity of the solution which has been transported through the extruder was evaluated by the presence or absence of cellulose particles. The undissolved particles were observed on Zeiss Polarization Microscope.

EXAMPLE 1

Cellulose sheets having $DP_w$ of 660 (Cellunier-F, ITT Corporation) were milled in a knife mill (Pallmann, PS 5-10) with a ring sieve (opening 350 μm) to obtain cellulose powder of 180 μm or less in apparent diameter at the rate of 500 kg/hr.

A molten liquid NMMO containing 12% by weight of water at 100° C. was injected into the first block of a twin screw extruder (Theysohn ZSK-30), whose structure is illustrated in FIG. 2, at the rate of 9,000 g/hr by a gear pump. Then, the cellulose powder was fed into the third block of the twin screw extruder by the side feeder at the rate of 1,000 g/hr. The temperature profile of the twin screw extruder from the first block to the ninth block was: 90° C., 75° C., 75° C., 120° C., 120° C., 120° C., 120° C., 120° C. and 120° C.

The screws were operated at 180 rpm to discharge 10,000 g of cellulose solution per hour. The concentration of the solution was 10% by weight of cellulose. The solution was very homogeneous without including any undissolved cellulose particle. The $DP_w$ of cellulose of the solution was 600, and the AOOD of the solvent was 0.011.

EXAMPLE 2

The same extruder as in Example 1 was used in this example.

The operation conditions were exactly the same as in Example 1, except that the temperature profile of the twin screw extruder from the first block to the ninth block was: 100° C., 100° C., 100° C., 120° C., 120° C., 120° C., 120° C., 120° C. and 120° C.

The cellulose solution obtained at this temperature profile was not completely homogeneous and contained some insoluble cellulose particles.

EXAMPLE 3

The same extruder as in Example 1 was used in this example.

The operation conditions were exactly the same as in Example 1, except that the feeding rate of cellulose powder was 1,227 g/hour. The screws were operated at 180 rpm to discharge 10,227 g of cellulose solution per hour. The concentration of the solution was 12% by weight of cellulose. The solution was very homogeneous without including any undissolved cellulose particle.

EXAMPLE 4

The same extruder as in Example 1 was used in this example.

Cellulose sheets having $DP_w$ of 1,000 (Rayon-EXP, ITT Corporation) was milled in a knife mill (Pallmann, PS5-10) with a ring sieve (opening 300 μm) to obtain cellulose powder.

The operation conditions were exactly the same as in Example 1, except the molecular weight of the cellulose and the feeding rate of cellulose powder (780 g/hr). The screws were operated at 180 rpm to discharge 9,780 g of 8% by weight of cellulose solution.

The solution thus obtained was very homogeneous and contained little undissolved cellulose particles. The $DP_w$ of cellulose of the solution was 890, and the AOOD of the solvent was 0.0013.

What is claimed is:

1. A process for preparing a homogeneous cellulose solution which comprises the steps of:

(a) preparing fibrillar cellulose powder;

(b) injecting a molten liquid tertiary amine oxide solvent into a twin screw extruder;

(c) feeding the cellulose powder of step (a) into a section of the twin screw extruder where the molten liquid tertiary amine oxide solvent fed in step (b) produces a well swollen paste with the cellulose powder fed in step (c);

(d) dissolving the well swollen cellulose paste in the following melting sections in the twin screw extruder; and (e) stabilizing the solution obtained in step (d) in a storage tank.

2. The process according to claim 1, wherein the particle size of the fibrillar cellulose powder is less than the apparent diameter of 1,000 μm.

3. The process according to claim 1, wherein the liquid tertiary amine oxide solvent is N-methylmorpholine-N-oxide solvent which has a water content of 5 to 20% and is maintained at 50 to 130° C.

4. The process according to claim 1, wherein the concentration of cellulose solution is 5 to 20% by weight.

5. The process according to claim 1, wherein the fibrillar cellulose powder is provided in a mill fitted with ring sieves.

* * * * *